Aug. 23, 1966 FUH-LIN WANG 3,268,821

TIMING OR CLOCK PULSE GENERATOR EMPLOYING PLURAL COUNTERS CAPABLE OF BEING SELECTIVELY GATED

Filed Dec. 4, 1963 2 Sheets-Sheet 1

INVENTOR
FUH-LIN WANG
John V. Regan
Attorney

Aug. 23, 1966
FUH-LIN WANG
3,268,821
TIMING OR CLOCK PULSE GENERATOR EMPLOYING PLURAL COUNTERS
CAPABLE OF BEING SELECTIVELY GATED
Filed Dec. 4, 1963
2 Sheets-Sheet 2

INVENTOR.
FUH-LIN WANG
BY John V. Regan
Attorney

United States Patent Office 3,268,821
Patented August 23, 1966

3,268,821

TIMING OR CLOCK PULSE GENERATOR EMPLOYING PLURAL COUNTERS CAPABLE OF BEING SELECTIVELY GATED

Fuh-lin Wang, Levittown, N.J., assignor to Radio Corporation of America, a corporation of Delaware Filed Dec. 4, 1963, Ser. No. 328,094
9 Claims. (Cl. 328—62)

This invention relates to improved systems for generating sequences of timing or clock pulses.

In information handling systems such as digital computers, it is necessary to generate timing or clock pulses which are used to regulate the system operation. These clock pulses may be either synchronous or asynchronous or both and must be accurately controlled so as to prevent spurious operating signals from being generated. It is desirable that the pulse generator also be flexible so as to provide, when necessary, subsequences within the main sequence, or in certain instances, sequences which can at will omit particular ones of the pulses. This type of flexibility is advantageous in that the length of a timing cycle can be readily adapted to various operations thus reducing the operating time for relatively simple operations. In general, the prior art pulse generators have been relatively complex and expensive, and particularly so when of the flexible type.

It is an object of the present invention to provide an improved pulse generator which although simple in structure can generate sequences or sub-sequences of accurately controlled timing pulses.

Another object of the invention is to provide an improved pulse generator which can generate different patterns of timing pulses.

According to the present invention, a pulse generator includes a plurality of flip-flop circuits, the number N of such flip-flops being equal to the maximum number of timing pulses desired to be generated. The flip-flops are arranged in two or more groups. A separate start-stop oscillator is provided for each of the flip-flop groups. Between each group of flip-flops and its associated start-stop oscillator is provided a set of gates. Each of the gates of a set is used to initiate a particular timing pulse and to apply a start signal to its oscillator circuit. After a fixed time the oscillator then provides an output which is used to terminate the particular timing pulse. The oscillator output from each group is also applied as a shifting signal to its associated group of flip-flops to transfer the signal in one flip-flop to the succeeding flip-flop.

Both the "1" and "0" outputs of the flip-flops are used to respectively initiate and inhibit the generation of a higher order timing pulse until after the flip-flop controlling the lower order timing pulse has been reset. This arrangement insures the existence of a finite time interval between the termination of one timing pulse and the initiation of a succeeding timing pulse. The finite delay essentially produces a "guard band" between the trailing edge of one pulse and the leading edge of a succeeding pulse and is particularly advantageous in high-speed operation.

A sub-sequence of N timing pulses can be generated by applying a stop signal to the flip-flops of the group which controls the generation of the N+1th pulse. Any particular one or more timing pulses of a sequence can be omitted by applying stop signals to the flip-flop groups generating these pulses together with start signals to the particular flip-flops controlling the pulses immediately following the omitted pulses. If desired, the space normally occupied by a pulse omitted in a particular sequence is not left vacant but is occupied by the next higher order time pulse, thereby shortening the time for this particular sequence.

Figure 1:
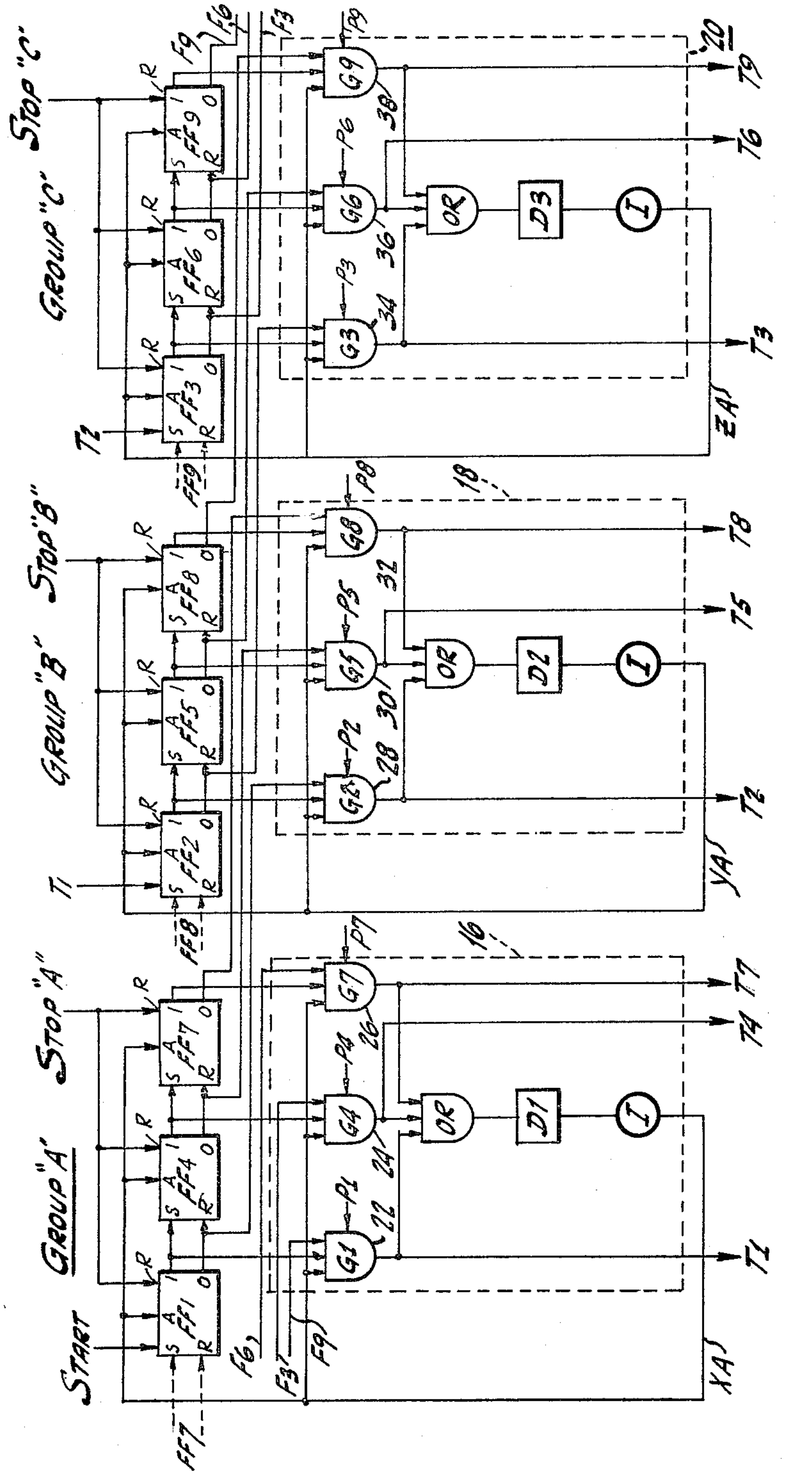
FIGURE 1 is a schematic diagram of an embodiment for a pulse generator system according to the invention.

The system of FIGURE 1 illustratively has three flip-flop groups A, B, C, with each group having three flip-flops. The nine flip-flops of the three groups can generate up to nine separate timing pulses or any combination of these pulses. More or less flip-flops can be used to generate sequences having a larger or fewer number of timing pulses. In case the maximum number of timing pulses is not divisible by three, the remainder if one is allotted to group A, and the remainder if two is allotted to groups A and B. Thus, a system for generating eight timing pulses would have three flip-flops in both groups A and B and two flip-flops in group C. The flip-flops of each group are connected in an ordered sequence such that the output of a lower ordered flip-flop in a group is connected in the input of the next higher order flip-flop of that same group.

If it is desired to generate continuous sequences, then the output of the highest order flip-flop of a group also is connected to the input of the lowest ordered flip-flop in the same group. This latter connection is indicated by the dotted lines at the input of the lowest order flip-flop of each group.

Three start-stop oscillator circuits 16, 18 and 20 are used in generating the timing pulses. The "1" outputs of the first group A flip-flops are applied as respective enabling inputs to a set of input gates 22, 24 and 26 of the first oscillator 16; the "1" outputs of the second group B of flip-flops are applied as respective enabling inputs to a set of gates 28, 30 and 32 of the second oscillator 18; and the "1" outputs of the third group C of flip-flops are applied as respective enabling inputs to a set of gates 34, 36 and 38 of the third oscillator 20. The "0" outputs of the group A flip-flops are applied as respective inhibiting to the second oscillator input gates; the "0" outputs of the group B flip-flops are applied as respective inhibiting inputs to the third oscillator input gates; and the "0" outputs of the group C flip-flops are applied as respective inhibiting inputs to the first oscillator input gates. In general, the "0" output of the nth flip-flop is used to inhibit the $n+1$th input gate and with the "0" output of the highest order flip-flop inhibiting the lowest order input gate.

In the arrangement described herein, the input gates of an oscillator circuit are respectively inhibited by the timing pulse outputs of the other oscillator circuit rather than by the "0" outputs of the flip-flops themselves. The advantage of using the "0" outputs of the flip-flops is explained later in connection with the system operation.

A third input to each of the oscillator gates is a permit input designated P1–P9, respectively, for the nine input gates. These permit inputs correspond to return signals and are employed only when asynchronous timing pulses are used. In practice, when the timing pulses are all synchronous, none of the permit inputs P1–P9 is used, and where a mixed sequence of synchronous and asynchronous pulses are required, then only those gates producing the asynchronous timing pulses have a permit input. The three oscillator outputs XA, YA and ZA, respectively, are fed back to their three associated sets of input gates. The outputs XA, YA and ZA are also used to advance the flip-flop groups A, B and C, respectively.

Briefly, each oscillator circuit has a separate input gate for each timing pulse generated by that circuit. For example, the first circuit 16 has three gates and generates the timing pulses T1, T4 and T7. The second oscillator 18 generates timing pulses T2, T5 and T8, and the third oscillator 20 generates the timing pulses T3, T6 and T9. Thus, the oscillators are arranged to successively generate successive ones of the timing pulses. It should be noted that the individual oscillators and flip-flop groups need operate at only one-third the repetition rate or frequency of the timing pulse sequence. This feature is advantageous in that the gates themselves, both in the oscillator circuits and in the counter, can use relatively slower speed circuitry which is more easily designed and less costly than higher speed gates which would otherwise be needed.

The input gates of each oscillator have their outputs connected to a separate OR circuit and a separate fixed delay circuit D1, D2 or D3 and a separate inverter I to the respective output lines XA, YA and ZA. The delay circuit has a fixed delay time equal to the minimum width of the timing pulse generated by that oscillator. Conveniently, the delay times of the circuits D1, D2 and D3 are equal to each other.

A timing pulse sequence is started by applying a start signal to the set input of flip-flop FF1 of the first group A. The second group B receives a start input applied to the set input of FF2 from the timing pulse T1 output of the oscillator circuit 16. The third group C receives a start signal applied to the set input of FF3 from the timing pulse T2 output of the oscillator circuit 18. A stop "A" signal is applied to the reset input of each of the flip-flops of the group A; a stop "B" signal is applied to the reset inputs of the flip-flops of the second group B; and a stop "C" input is applied to the reset inputs of the flip-flops of the third group C. These stop "A," "B" and "C" signals are used in generating sub-sequences of timing pulses as described hereinafter.

Figure 2:
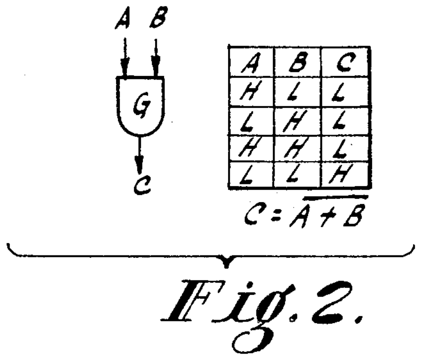
FIGURE 2 is a symbolic diagram of a gating circuit useful in the present invention.

Preferably, each of the input gates performs a NOR function and produces an output at one level, say "low," when any of its inputs is at the opposite level, in this case a "high" level. The gate produces a "high" output when and only when all of its inputs are at a "low" level. The symbolic diagram of FIGURE 2 illustrates the gate operation. This type of gate is well known in the art. However, other type circuits, such as NAND or AND-OR may be used in the circuit.

A flip-flop may comprise two of the NOR gates cross-coupled to each other in conventional fashion. The flip-flop has set "S" and reset "R" inputs and corresponding "1" and "0" outputs. In the set state the "1" output of a flip-flop is relatively "low," and the "0" output relatively "high," and vice versa, in the reset state. The flip-flops are connected in sequence such that the state of any one flip-flop is transferred to the next succeeding flip-flop when an advance signal is applied to its advance input "A." The advance signal also resets the one flip-flop. The start signal places a flip-flop in the set state, and a stop signal places a flip-flop in the reset state.

Figure 3:
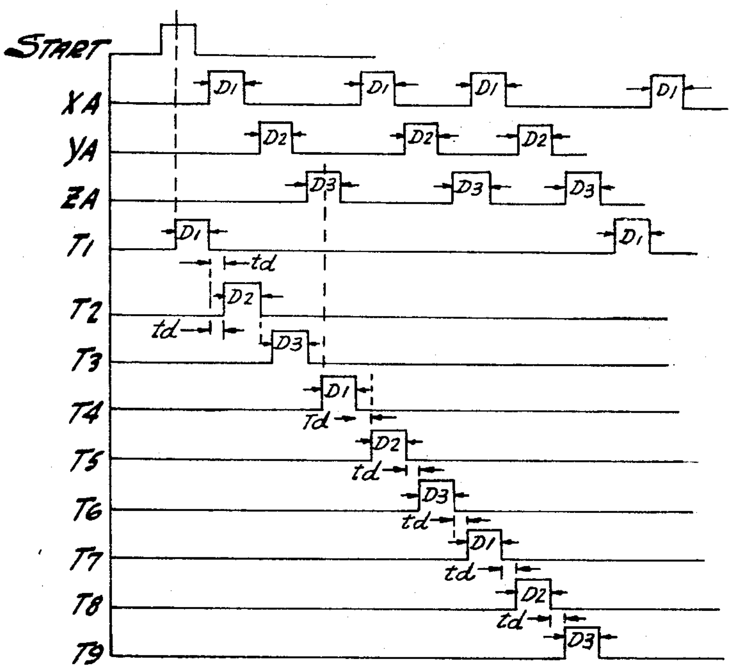
FIGURE 3 is a timing diagram illustrating the operation of the system of FIGURE 1; and, FIGURE 4 is a schematic diagram of an arrangement for obtaining return signals when asynchronous pulses are generated.

The system operation will be described in connection with the timing diagram of FIGURE 3. Initially, each of the flip-flops is in one state, say reset, and its "1" output is at a relatively high level and its "0" output at a relatively low level. Accordingly, each of the input gates of the oscillator circuit is receiving at least one "high" input and its output is at a "low" level. Each input to the OR circuit of an oscillator thus is at the "low" level and therefore its output is at a "high" level. The inverters I thus provide a normally "low" enabling level to the XA, YA and ZA lines. These later levels are also applied as enabling inputs to the corresponding oscillator input gates. Assume for the moment that the system is operating in a synchronous mode and thus each of the permit leads P1–P9 is at a "low" enabling level, or need not be present. The gate G1 also has a "low" enabling level applied to its third input F9 since flip-flop FF9 is reset at this time.

The start signal applied to the set input of flip-flop FF1 of oscillator 16 changes its output F1 to a "low" level, thus activating the input gate 22 of oscillator 16 initiating timing pulse T1. The OR circuit output changes to a low level and is applied to the delay circuit D1. After the fixed delay D1, inverter I changes the "low" level to a "high" level output XA advancing the signal from flip-flop F1 to flip-flop F4. The high level signal XA inhibits the gate 24 and this gate output changes to a "low" level terminating timing pulse T1. Thus, the duration of the timing pulse is fixed by the delay circuit and is independent of the resetting of the associated flip-flop.

When the start signal sets the flip-flop FF1, the "0" output changes from the enabling "low" level signal to a "high" inhibiting signal. This inhibiting level is applied to gate G2 of oscillator 18 and prevents this gate from initiating timing pulse T2 while the flip-flop FF1 is reset. In effect, the FF1 "0" level insures that the timing pulse T2 cannot be generated until after the timing pulse T1 is ended and that no "race" or "spike" conditions can occur regardless of the relative switching times of the flip-flops and gating circuits.

The timing pulse T1 is applied to the set input of flip-flop FF2 changing this flip-flop from the reset to the set state and changing its "1" output from a "high" to a "low" level. Accordingly, the gate G2 is now enabled at the F2 input and inhibited at the F1 input. When the "high" XA level advances the start signal from flip-flop FF1 to FF4, the F1 "0" level changes to a "low" level and at this time the input gate G2 is activated, initiating timing pulse T2. It should be noted that the XA level used to change the flip-flop FF1 terminates the timing pulse T1. Hence, the additional delay required by the flip-flop FF1 to change from the set to the reset state insures that the leading edge of the timing pulse T2 cannot be generated until after the termination of the timing pulse T1. Hence, a "guard band" is always provided between the falling edge of one pulse and the leading edge of the next succeeding pulse. This "guard band" is particularly advantageous in high speed operation where it is difficult to precisely control the turn-on and turn-off time of transistor flip-flops and gates. The timing diagram of FIGURE 3 illustrates the relationship between the various signals. The start pulse is terminated before the XA signal changes to a "high" level in order to avoid the tendency to hold the flip-flop FF1 in the set condition during the advance pulse XA. The width of the XA pulse is for practical purposes equal to the delay time D1 produced by the delay circuit of oscillator 16. The "guard band" *td* between the termination of the timing pulse T1 and the initiation of timing pulse T2 is equal to the time required to reset the flip-flop FF1 and activate the gate G2. This delay time *td* may vary slightly from flip-flop to flip-flop but in no case will it be zero. Hence, the successive timing pulses are separated from each other by some delay time which is at least equal to the switching time of the preceding flip-flop.

The output of gate G2 of oscillator 18 is applied through the OR circuit to the delay circuit D2 of the oscillator 18, and after the delay time D2, the oscillator signal is inverted by the inverter I changing the signal YA from a "low" to a "high" level. In FIGURE 2, the delay time D2 is indicated to be equal to that of delay time D1. Note, however, in practice, the delay D2 may be greater than or less than the delay time D1, as desired.

The "high" level YA signal terminates the timing pulse T2 and advances the signal in flip-flop FF2 to flip-flop FF5. The timing pulse T2 is applied to the flip-flop FF3 of the third group changing the F3 "1" level from a "high" to a "low" value. Accordingly, the input gate 34 of the third oscillator 20 is enabled at the F3 input during the timing pulse T2. When the YA signal changes the flip-flop FF2 from the set to the reset state, the F2 "0" level changes from the "high" to a "low" value and the timing pulse T3 is initiated. Again, a delay time *td* occurs between the termination of the timing pulse T2 and the initiation of the timing pulse T3 as indicated in FIGURE 2. The YA level remains "high" for a delay time shown equal to D2 and then changes to a "low" level as indicated in FIGURE 3.

After delay time D3, the ZA level changes from a "low" to a "high" value and is applied to the flip-flop group C shifting the set signal from flip-flop FF3 to flip-flop FF6. Again, in practice, the delay time D3 is made equal to or greater or less than the delay times D1 and D2. In the latter case, the output pulses generated by the oscillator 20 would have a longer or shorter duration, as the case may be, from the pulses generated by the other oscillator circuits.

The F3 "0" level changes from the "high" to the "low" value when the flip-flop FF3 is reset thereby activating the input gate G4 of the oscillator 16 to initiate timing pulse T4. Recall that the flip-flop FF4 of the first group A was in the set state and the FF4 "1" level is "low" during the timing pulse T3.

The operation proceeds in similar fashion with each of the three oscillator circuits successively generating one of the timing pulses and the operation repeating until the final timing pulse T9 of the sequence. At this time, if continuous sequences are to be generated, a new timing pulse T1 is initiated after the "guard band" *td.* As described above, when continuous sequences are desired, the outputs of the last flip-flop of a group are coupled to the inputs of the first flip-flop in a closed ring, hence the flip-flop FF1 is in the set condition prior to the termination of the timing pulse T9.

If single sequences are desired, then the closed ring connection is not used and no further timing pulses are generated until a new start signal is applied to set flip-flop FF1.

Sub-sequences of timing pulses are generated by using the stop "A," "B" and "C" lines. For example, if three timing pulses T1, T2 and T3 are desired as a sub-sequence, then the stop "A" signal is generated at any time between the beginning of timing pulse T2 and the end of timing pulse T3. The stop "A" signal resets the flip-flops of the first group A. Thus, only the timing pulses T1, T2 and T3 are generated and T4 is inhibited due to the "high" level "1" output from the flip-flop FF4. A stop "B" signal is applied to reset the group B flip-flops at any time after the end of timing pulse T2 and the end of timing pulse T3. A stop "C" pulse is applied to reset the group C flip-flops after the timing pulse T3 and before a timing pulse T6 can be initiated. The timing of the various stop "A," "B" and "C" signals can be controlled by the timing pulses themselves or by the XA, YA and ZA levels together with a command signal. The control for the stop signals is not indicated since it can be of conventional type.

If the first six pulses of the sequence were desired, then the stop "A" signal is applied after the end of timing pulse T4 and before the end of timing pulse T6 to prevent the timing pulse T7 from being generated. The stop "B" signal is applied after the end of timing pulse T5 and before the end of timing pulse T6 to prevent the timing pulse T8 from being generated, and the stop "C" signal is applied after the timing pulse T6 to prevent the timing pulse T9 from being generated. It can be seen that in those operations where fewer timing pulses of a sequence are required that the generator of the present invention provides in relatively simple manner a time saving in that a new sequence or sub-sequence of timing pulses can begin as soon as the last necessary pulse is generated. This should be contrasted with certain prior art generators which require a variable waiting time between the last pulse of a sub-sequence and the first pulse of a new sequence.

Other machine operations may not require one or more particular ones of the timing pulses provided in a sequence. For example, an operation may not use the timing pulses T4 annd T6 but does use the remaining pulses. In such case, time savings can be obtained by generating only a seven-pulse sequence with pulses T5 and T7 immediately following the pulses T3 and T5, respectively.

For example, assume that in the operation of the FIGURE 1 arrangement it is desired to skip the timing pulses T4 and T6. In this case, a stop "B" pulse is applied to the flip-flops of the group A after the timing pulse T1 and upon termination of the timing pulse T3. The gate G5 of oscillator 18 then is enabled at the F4 "0" input because the flip-flop FF4 is reset. Recall that the gate G5 input from the FF5 "1" output is already enabled so that upon resetting of the flip-flop FF4 the timing pulse T5 is initiated. At this time a set signal (not shown) is applied to the set input of flip-flop FF7 to permit the generation of timing pulse T7. It should be noted that the timing pulse T5 begins after the end of timing pulse T3 and in place of the omitted timing pulse T4. At the end of timing pulse T5, a stop "C" signal is applied to reset the group C flip-flops. Hence, at this time the "1" output of flip-flop FF6 is "high" inhibiting the gate G6. The "0" output of FF6 is "low" enabling gate G7 to initiate timing pulse T7. At this time, a set signal (not shown) is applied to the set input of flip-flop FF9 to permit the generation of timing pulse T9. Note also that timing pulse T7 begins after the timing pulse T5 and in place of the timing pulse T6. The operation then continues in normal fashion with the generation of the timing pulses T8 and T9 to complete the sequence. Other different sequences of the timing pulses can be generated in similar fashion by applying combinations of the stop and set signals to the counter flip-flops.

Figure 4:
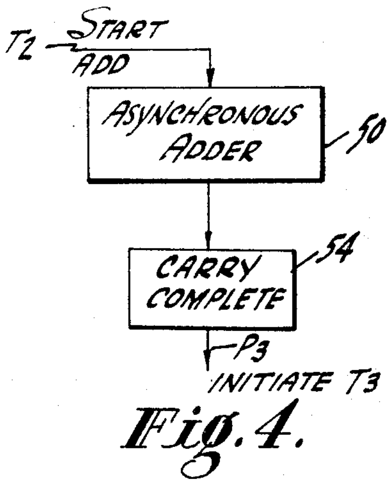

The permit inputs P1–P9 are used in generating asynchronous pulses. An asynchronous pulse is one in which the space between it and the next succeeding pulse is determined by the operating time of the unit receiving the pulse. This should be contrasted with the synchronous case where the space between successive pulses essentially is determined by the delay circuit. FIGURE 4 is a block diagram illustrating one arrangement for generating a permit signal for use in asynchronous operation. Here, it is assumed that the add operation of an asynchronous adder unit 50 is started by the timing pulse T2 generated by the gate G2 of FIGURE 1. In such an adder the add time is dependent upon the number of ones and zeros in the addend and augend. The permit level P3 from the carry complete unit 54 is normally "high" and changes to a "low" level only when the add operation is completed. The P3 level is applied to an input of the gate G3 of oscillator 20 and inhibits the generation of timing pulse T3 until the P3 level changes to the "low" value.

Thus, the system operates in the fashion described above for the synchronous case, except that the gate G3 remains inactive until the "1" output of flip-flop FF3, the "0" output of the flip-flop FF2, and the permit input P3 all are at the "low" level. Thus, the timing pulse T3 still cannot be initiated until after the termination of the timing pulse T2, i.e., the "guard band" is preserved, but the actual time when the pulse T3 is initiated is now dependent upon the add time of the adder unit 50.

A mixed synchronous and asynchronous sequence can be obtained by connecting permit inputs to those of the input gates which generate the asynchronous pulses. The remaining input gates do not require the permit inputs.

It can be seen from the above description that the pulse generator of the present invention is highly flexible in that various types of pulse sequences can be generated with a minimum amount of modification being required.

What is claimed is:

1. A pulse generator comprising a counter having N flip-flop stages, each stage having "1" and "0" outputs, at least two oscillator circuits, each of said circuits having a set of input gates, separate inputs of each of said gates of a first said circuit being connected, respectively, to the "1" outputs of a first group of said flip-flops and to the "0" outputs of a second group of said flip-flops, separate inputs of each of said input gates of a second of said circuits being connected, respectively, to the "1" outputs of said second group of flip-flops and to the "0" outputs of said first group of flip-flops, said first and second oscillator circuits each having an output coupled to advance a count in said counter, and said input gates of said first and second oscillators alternately generating output pulses.

2. A pulse generator comprising a counter having N ordered flip-flops, said flip-flops being divided into three groups with successive higher ordered number ones of said flip-flops being associated with successive ones of said three groups in rotation, three start-stop oscillator circuits, each of said circuits having a set of input gates, each gate corresponding to one of said flip-flops, and each oscillator circuit having an output, the "1" outputs of said first group of flip-flops being connected, respectively, to an input of corresponding ones of said input gates of said first oscillator circuit and the "0" outputs of said third group of flip-flops each being connected as an inhibiting input to a respective different one of said first input gates, said "1" outputs of said second group of flip-flops being connected as enabling inputs to corresponding ones of said second oscillator input gates and said "0" outputs of said first group of flip-flops each being connected as an inhibiting input to a respective different one of said second circuit input gates, said "1" outputs of said third group of flip-flops being connected as enabling inputs to corresponding ones of said third circuit gates and said "0" outputs of said second group of flip-flops each being connected as an inhibiting input to a respective different one of said third circuit input gates, means connecting each said circuit output to advance its said associated group of flip-flops, each of said input gates providing a timing pulse output, a timing output of said first circuit being connected to set the first flip-flop of said second group, and a timing output of said second circuit being connected to set the first flip-flop of said third group.

3. A pulse generator as claimed in claim 2, wherein each of said groups of flip-flops is connected in a closed ring.

4. A pulse generator comprising N groups of flip-flops connected in ordered sequence within each group, each flip-flop having first and second outputs corresponding to set and reset states, respectively, N start-stop oscillator circuits, each having a set of input gates for producing separate timing pulses and said input gates each corresponding to a flip-flop in one of the N groups, the "1" outputs of the flip-flops of the Nth group being connected to the Nth oscillator circuit and the "0" outputs of the Nth group being connected to the N+1th oscillator circuit, and with the "0" outputs of the highest ordered one of said N group of flip-flops being connected to the lowest ordered oscillator circuit, each said oscillator circuit having an output connected to apply an advance signal to its associated group of flip-flops, at least one group of said flip-flops further having a separate stop line for resetting all the flip-flops of that one group, a timing pulse output of said first circuit being applied as a set signal to the first flip-flop of the second group, a timing pulse output of said second circuit being connected as a set signal to the first flip-flop of the third group, and so on, and means for applying a start signal to the set input of the first flip-flop of said first group to produce a pulse sequence.

5. A pulse generator as claimed in claim 4, including means for selectively applying start and stop signals to selected ones of said flip-flop groups to generate different pulse sequences.

6. A pulse generator as claimed in claim 4, including separate set signals for different ones of said flip-flops, and means for selectively applying said stop and set signals selectively to selected ones of said flip-flops in said flip-flop groups to produce different sequences of said pulses.

7. A pulse generator comprising N groups of flip-flops for generating N timing pulses, each flip-flop having set and reset inputs and corresponding "1" and "0" outputs, N start-stop oscillator circuits, one for each separate group of flip-flops, each said circuit having a plurality of input gates, each said gate producing a separate one of said timing pulses, the "1" outputs of the Nth group of said flip-flops being coupled as enabling inputs to respective ones of said input gates of said Nth circuit, the "0" outputs of said Nth group of flip-flops being coupled as inhibiting inputs to respective ones of said N+1th group of input gates, the outputs of all said input gates of a circuit being coupled to an OR circuit and a delay circuit, said delay circuit output being coupled as an enabling input to the input gates of the same circuit and as an advance input to the associated group of flip-flops, means for applying separate stop signals to certain ones of said groups of flip-flops, a said stop signal resetting all said flip-flops of a group, means for applying individual set signals to certain ones of said flip-flops in each said group, means for applying an output of the lowest ordered gate of any one of said groups to the set input of the first flip-flop of the next succeeding group, and means for selectively applying said stop and set signals to said flip-flop groups and to said individual flip-flops to selectively generate different pulse sequences.

8. A pulse generator as claimed in claim 7, wherein each of said groups is connected in a closed ring.

9. A pulse generator as claimed in claim 7, each of said input gates having a further inhibiting input to inhibit the generation of a timing pulse until an operation commanded by a preceding timing pulse is completed.

References Cited by the Examiner

UNITED STATES PATENTS

| | | | |
|---|---|---|---|
| 3,168,700 | 2/1965 | Gesek et al. | 328—63 X |
| 3,212,010 | 10/1965 | Podlesny | 328—97 |

ARTHUR GAUSS, *Primary Examiner.*

J. S. HEYMAN, *Assistant Examiner.*